(12) United States Patent
Chen et al.

(10) Patent No.: US 11,040,586 B2
(45) Date of Patent: Jun. 22, 2021

(54) AUTOMATICALLY RETRACTABLE AUTOMOBILE TOWING DEVICE

(71) Applicant: Ningbo Xuli Metal Products Co., Ltd., Ningbo (CN)

(72) Inventors: Weiguo Chen, Ningbo (CN); Yanqiong Chen, Ningbo (CN); Wei Deng, Ningbo (CN)

(73) Assignee: Ningbo Xuli Metal Products Co., Ltd., Ningbo (CN)

( * ) Notice: Subject to any disclaimer, the term of this patent is extended or adjusted under 35 U.S.C. 154(b) by 301 days.

(21) Appl. No.: 16/389,744

(22) Filed: Apr. 19, 2019

(65) Prior Publication Data

US 2019/0329611 A1 Oct. 31, 2019

(30) Foreign Application Priority Data

Apr. 25, 2018 (CN) .......................... 201810380578.2

(51) Int. Cl.
| | | |
|---|---|---|
| *B65H 75/40* | (2006.01) | |
| *B60D 1/18* | (2006.01) | |
| *B65H 75/44* | (2006.01) | |

(52) U.S. Cl.
CPC ............ *B60D 1/185* (2013.01); *B60D 1/182* (2013.01); *B65H 75/40* (2013.01); *B65H 75/4402* (2013.01); *B65H 75/4471* (2013.01)

(58) Field of Classification Search
CPC . B60D 1/18; B60D 1/38; B60D 1/182; B60D 1/185; B65H 75/40; B65H 75/4402; B65H 75/4471
See application file for complete search history.

(56) References Cited

U.S. PATENT DOCUMENTS

| | | | |
|---|---|---|---|
| 8,651,509 B1 * | 2/2014 | Huang | B60D 1/185 280/480.1 |
| 8,684,390 B1 * | 4/2014 | Barrette | B60D 1/185 280/480.1 |
| 2007/0170295 A1 * | 7/2007 | Breeden | B65H 75/4402 242/388.1 |

* cited by examiner

*Primary Examiner* — Sang K Kim
(74) *Attorney, Agent, or Firm* — Wang Law Firm, Inc.

(57) ABSTRACT

The present invention discloses an automatically retractable automobile towing device, which comprises a hollow housing (1), two coil springs (2), a winding shaft (3) and a towing belt (4). The housing (1) has a mounting chamber (10) and two first through holes (13). The winding shaft (3) is rotatably assembled in the mounting chamber (10) and can maintain the towing belt (4). The towing belt (4) is able to extend and retract with rotation of the winding shaft (3). The present invention further discloses a limiting mechanism. In the present invention, the stability of automobile towing is improved, the deviation of the towing belt during the retraction process is avoided so that the towing belt is allowed to stretch or retract smoothly.

10 Claims, 7 Drawing Sheets

AUTOMATICALLY RETRACTABLE AUTOMOBILE TOWING DEVICE

RELATED APPLICATIONS

This application claims benefit to Chinese Patent Application for an automatically retractable automobile towing device, 201810380578.2, filed on Apr. 25, 2018. The specification of the application is incorporated here by this reference.

FIELD OF THE INVENTION

The present invention relates to an automatically retractable automobile towing device.

DESCRIPTION OF THE PRIOR ART

Generally, hooks are provided at both ends of an automobile tow rope. When in use, a tow vehicle and a vehicle to be towed are caught by the hooks. However, since the distance between two vehicles cannot be maintained stably during driving, the rope is very likely to fall down to the ground. Moreover, a common tow rope may get tangled when it is carried along with the vehicle. As a result, it looks very messy, a larger space is occupied, and it is very inconvenient to use.

To solve the above problems, Chinese Invention Patent Publication CN201721276U, entitled AUTOMATICALLY WINDABLE AUTOMOBILE TOWING DEVICE, disclosed a structure, including a rope with hooks at its both ends, wherein the rope is wound on a spindle in a hollow housing, and both ends of the rope are exposed to the housing; and a coil spring is also provided in the housing to form an automatic winding mechanism together with the spindle. In the above structure, the rope is automatically wound by the coil spring, and the rope is kept in an elastically tensioned state when in use. When the distance between two vehicles changes, the rope can also be stretched or retracted automatically, so that the rope will not fall down to the ground and it is safer for towing. Meanwhile, when not in use, just like a tape structure, the rope can be automatically wound in the housing. The structure is simple and compact and occupies a smaller space during carrying.

The automobile towing devices with the above structure have provided convenience for user to a great extent. However, since the rope for towing directly passes through the spindle, when the rope is pulled out completely, the spindle is likely to move back and forth in a lengthwise direction of the rope. In this case, the rope on two sides of the spindle is different in length. Consequently, the stability of automobile towing is influenced. Moreover, it is likely to defect the rope in the tensioned state, and thus it is difficult to smoothly stretch or retract the rope, affecting its use.

SUMMARY OF THE INVENTION

In view of the current situation of the prior art, a technical problem to be solved by the present invention is to provide an automatically retractable automobile towing device which enables a winding shaft to be always positioned in a middle portion of a towing belt so as to improve the stability of automobile towing and enables the towing belt to be smoothly stretched or retracted.

To solve the above technical problem, the automatically retractable automobile towing device comprises: a hollow housing having a wall and a mounting chamber inside and two first through holes disposed on the wall and in communication with the mounting chamber;

two coil springs mounted inside the mounting chamber of the housing;

a winding shaft having a first end and a second end, being rotatably assembled in the mounting chamber of the housing and connected to the coil springs;

a towing belt having two ends and a middle portion, which passes through the winding shaft and is able to extend and retract with rotation of the winding shaft, each end of the towing belt extending out of the housing through the corresponding first through holes on the housing;

a limiting mechanism for limiting the winding shaft at the middle portion of the towing belt;

wherein the winding shaft has a second through hole arranged along a radial direction of the winding shaft for the towing belt to pass through; the towing belt has a third through hole arranged along an axial direction of the winding shaft formed in the middle portion of the towing belt; the middle portion of the towing belt is located inside the second through hole; a limiting block having a first end and a second end is disposed inside the third through hole of the towing belt, and the two ends of the limiting block is limited with the winding shaft; the limiting block, the second through hole and the third through hole forms the limiting mechanism.

Preferably, the winding shaft has a first limiting opening for receiving the end of the limiting block, so as to prevent the limiting block to make circumferential rotation. The limiting mechanism is hidden in the winding shaft, and no additional complicated accessories are required, so that no space is occupied and it is convenient to assemble.

Preferably, a positioning mechanism capable of preventing the axial movement of the limiting block in an axial direction of the winding shaft is further disposed on the winding shaft. Preferably, an annular first positioning step is protruding toward the limiting block from the inner wall of the winding shaft close to the first end of the limiting block, and an annular second positioning step is protruding toward the limiting block from the inner wall of the winding shaft close to the second end of the limiting block; correspondingly, a positioning protrusion extending from the first end of the limiting block is positioned by the first positioning step, and an elastic pin, extending from the second end of the limiting block, which can pass through the first positioning step under a pressed state is positioned by the second positioning step; the first positioning step, the second positioning step, the positioning protrusion and the elastic pin form the positioning mechanism. With the above mechanism, the axial deviation of the towing belt relative to the winding shaft can be avoided, and it is ensured that the towing belt is stretched or retracted smoothly.

In order to make the assembly much easier, the housing comprises a first half housing and a second half housing which matches each other; mounting grooves for mounting corresponding coil springs are formed on inner walls of the first half housing and the second half housing, respectively, and outer peripheral walls of the coil springs are matched with inner peripheral walls of the mounting grooves.

In order to make the assembly much easier, necks extending in a circumferential direction are formed on the inner peripheral walls of the mounting grooves; and correspondingly, clamping portions capable of being clamped into the necks are provided on the outer peripheral walls of the coil springs.

Preferably, cover plates capable of preventing the coil springs from escaping from the mounting grooves are disposed at openings of the mounting grooves, and inner hooks are disposed in middle portions of the coil springs; and correspondingly, through holes are formed on the cover plates, and the ends of the winding shaft pass through the corresponding through holes to be connected with the inner hooks. Shaft portions capable of being rotatably fitted with the through holes on the corresponding cover plate are disposed at both ends of the winding shaft, and clamping slots extending in an axial direction and capable of clamping the inner hooks of the coil springs are formed on sidewalls of the shaft portions. With the above design, the coil springs can be limited in the housing and the stability of stretching and retracting the towing belt can be improved by using the through holes on the cover plates as the support mechanisms for the rotation of the winding shaft.

In the above solutions, preferably, two hooks for connecting automobiles are disposed at both ends of the towing belt.

Preferably, first reinforcing ribs extending in a radial direction and second reinforcing ribs arranged at interval in an axial direction are disposed on the outer peripheral wall of the winding shaft. The first reinforcing ribs and the second reinforcing ribs are cross-linked to improve the force bearing performance of the winding shaft.

In the above preferred solutions, preferably, a connecting belt is disposed on a side surface of the middle portion of the towing belt, and two ends of the connecting belt are connected to the towing belt, respectively, such that the third through hole is formed between the middle portion of the connecting belt and the corresponding towing belt.

Compared with the prior art, the present invention has the following advantages. In the present invention, the winding shaft is limited to the middle portion of the towing belt by providing the limiting mechanism. When in use, no matter whether the towing belt is stretched or retracted, the position of the winding shaft remains unchanged, and the towing belt on two sides of the winding shaft is equal in length, so that the stability of automobile towing is improved.

Moreover, since the position of the winding shaft relative to the towing belt remains unchanged, the deviation of the towing belt during the retraction process is avoided so that the towing belt is allowed to stretch or retract smoothly, and the stability of automobile towing is further improved.

And the limiting mechanism in the present invention is relatively simple, and the fitting of the towing belt with the winding shaft is compact and reliable.

DETAILED DESCRIPTION OF THE PREFERRED EMBODIMENT

To enable a further understanding of the present invention content of the invention herein, refer to the detailed description of the invention and the accompanying drawings below:

FIGS. 1-8 show a preferred embodiment of an automatically retractable automobile towing device. The towing device comprises a hollow housing 1, two coil springs 2, a winding shaft 3, a towing belt 4 and cover plates 5.

Figure 1:
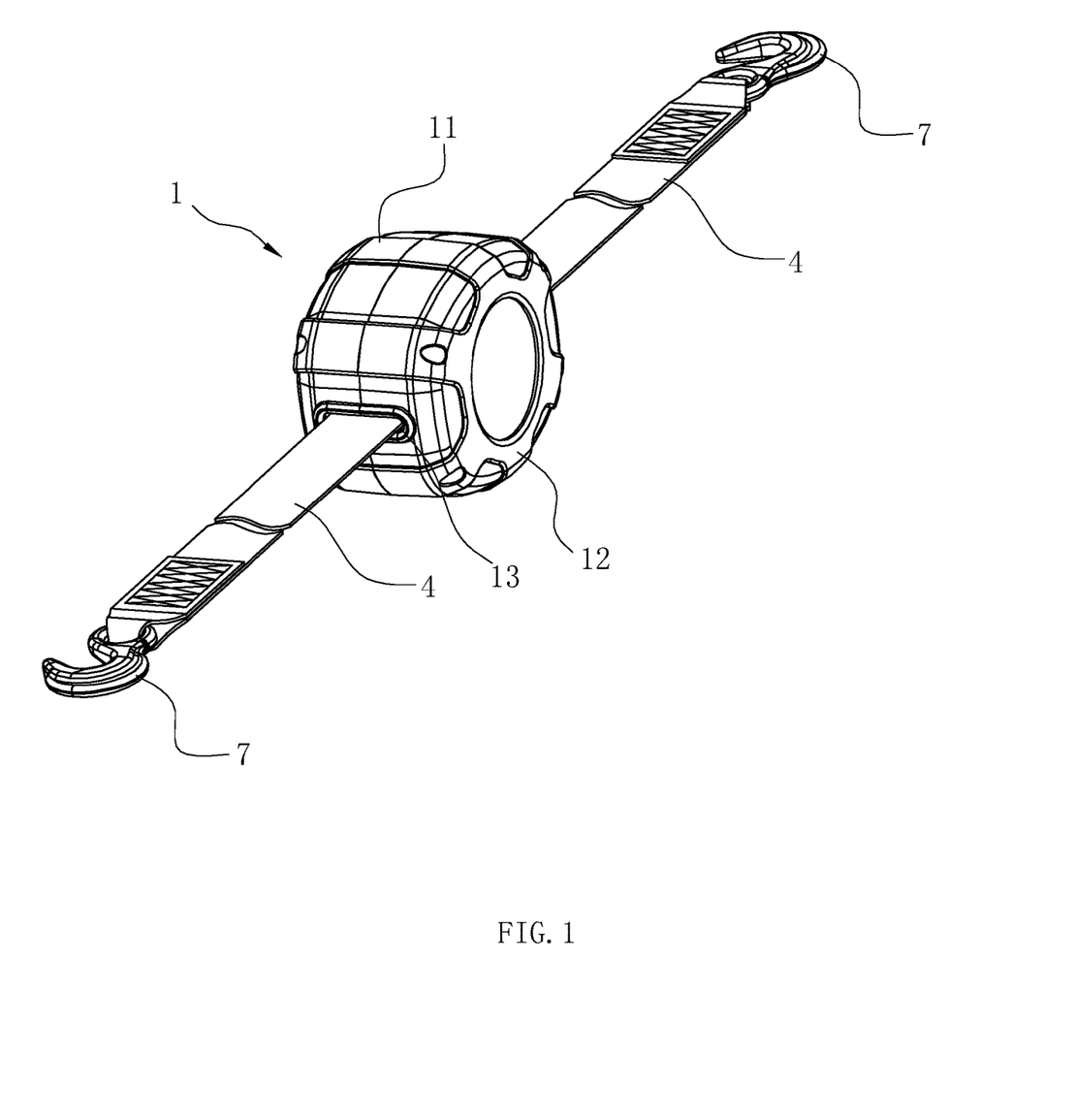
FIG. 1 is a perspective view of an automatically retractable automobile towing device according to an embodiment of the present invention.
Figure 2:
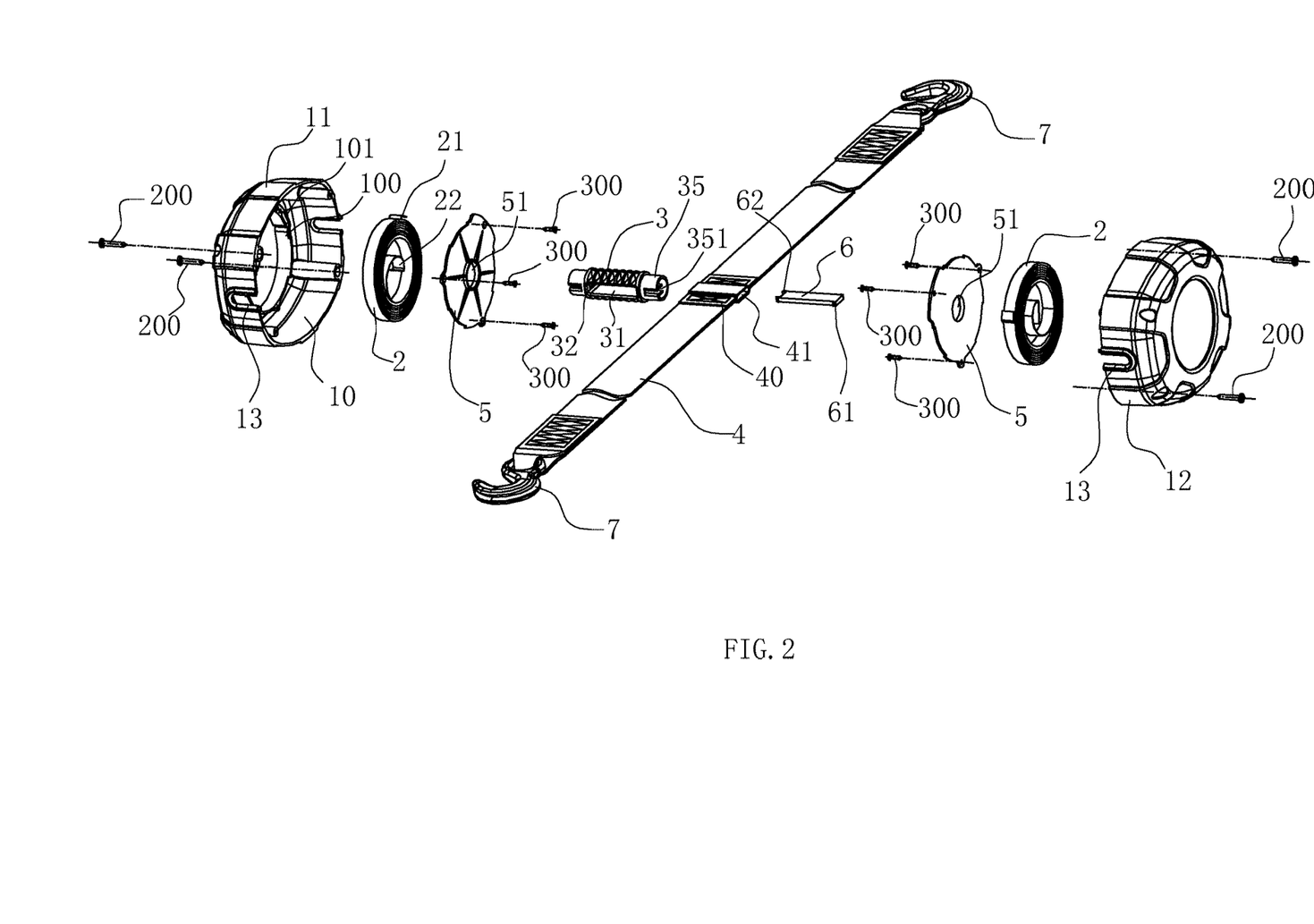
FIG. 2 is an exploded view of FIG. 1.

The housing 1 has a wall and a mounting chamber 10 inside and two first through holes 13 are disposed on the wall and in communication with the mounting chamber 10. The two coil springs 2 are mounted inside the mounting chamber 10 of the housing 1. The winding shaft 3 having a first end and a second end, is rotatably assembled in the mounting chamber 10 of the housing 1 and can maintain the towing belt 4 in a tensioned trend under the drive of the coil springs 2. The towing belt 4 having two ends and a middle portion, passes through the winding shaft 3 and is able to extend and retract with rotation of the winding shaft 3. Each end of the towing belt 4 extends out of the housing 1 through the corresponding first through holes 13 on the housing 1, and two hooks 7 for connecting automobiles are disposed at both ends of the towing belt 4. In this embodiment, the tor strap 4 is a flat braid. With such a structure, better and smoother stretching and retraction can be realized. In this embodiment, the coil springs 2 and the winding shaft 3 form a tensioning mechanism capable of automatically retracting the towing belt 4.

Figure 3:
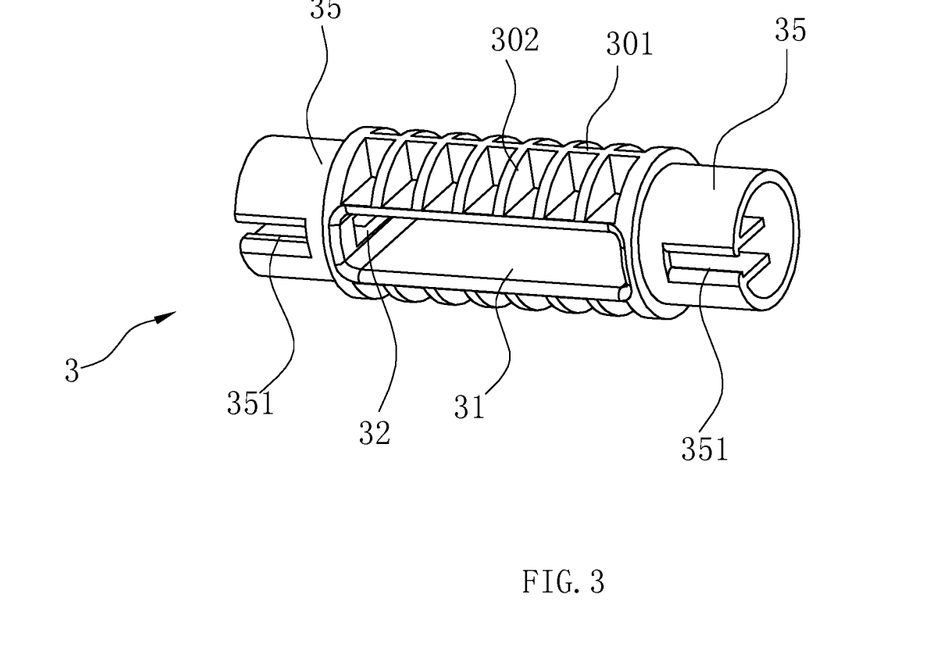
FIG. 3 is a perspective view of a winding shaft of FIG. 2.
Figure 4:
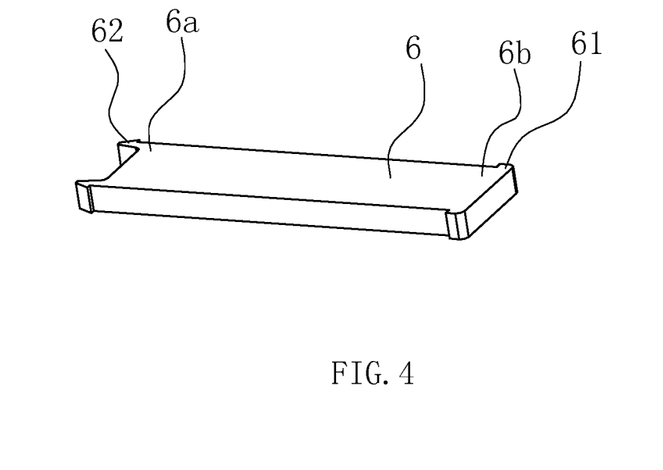
FIG. 4 is a perspective view of a limiting block of FIG. 2.

In this embodiment, the winding shaft 3 has is always limited to a middle portion of the towing belt 4 by a limiting mechanism. The winding shaft 3 has a second through hole 31 arranged along a radial direction of the winding shaft 3 for the towing belt 4 to pass through. The towing belt 4 has a third through hole 41 arranged along an axial direction of the winding shaft 3 formed in the middle portion of the towing belt 4, the middle portion of the towing belt 4 is located inside the second through hole 31. A limiting block 6 having a first end 6a and a second end 6b is disposed inside the third through hole 41 of the towing belt 4, and the two ends of the limiting block 6 is limited with the winding shaft 3. The limiting block 6, the second through hole 31 and the third through hole 41 forms the limiting mechanism. A connecting belt 40 is disposed on a side surface of the middle portion of the towing belt 4, and two ends of the connecting belt are connected to the towing belt 4, respectively, so that the third through hole 41 is formed between the middle portion of the connecting belt and the corresponding towing belt. Of course, the third through hole 41 can also be formed by lap-jointing the ends of two sections of the towing belt 1, that is, a section of the top strap 1 is reserved not to be connected in a middle portion of a lap-joint region during the lap-joint of two sections of the towing belt 4. The winding shaft 3 has a first limiting opening 32 for receiving the end of the limiting block 6, so as to prevent the limiting block 6 to make circumferential rotation. The limiting mechanism is hidden in the winding shaft 3, and no additional complicated accessories are required, so that no space is occupied and it is convenient to assemble.

In this embodiment, first reinforcing ribs 301 extending in a radial direction and second reinforcing ribs 302 arranged at interval in an axial direction are disposed on the outer peripheral wall of the winding shaft 3. There can also be a plurality of first reinforcing ribs 301 arranged at interval. The first reinforcing ribs 301 and the second reinforcing ribs 302 are cross-linked to improve the torque bearing strength of the winding shaft 3. A positioning mechanism capable of preventing the movement of the limiting block 6 in an axial direction of the winding shaft 3 is further disposed on the winding shaft 3, an annular first positioning step 33 is protruding toward the limiting block 6 from the inner wall of the winding shaft 3 close to the first end 6a of the limiting block 6, and an annular second positioning step 34 is protruding toward the limiting block 6 from the inner wall of the winding shaft 3 close to the second end 6b of the limiting block 6. Correspondingly, a positioning protrusion 61 extending from the first end 6a of the limiting block 6 is positioned by the first positioning step 33, and an elastic pin 62, extending from the second end 6b of the limiting block 6, which can pass through the first positioning step 33 under a pressed state is positioned by the second positioning step 34. The first positioning step 33, the second positioning step 34, the positioning protrusion 61 and the elastic pin 62 form the positioning mechanism. With the above structure, the axial deviation of the towing belt 4 relative to the winding shaft 3 can be avoided, and it is ensured that the towing belt is stretched or retracted smoothly.

In this embodiment, the housing 1 comprises a first half housing 11 and a second half housing 12 which matches each other. The first half housing 11 and the second half housing 12 are involutive with each other and are connected to each other by screws 200 to form the housing 1. Mounting grooves 100 for mounting the corresponding coil springs 2 are formed on inner walls of the first half housing 11 and the second half housing 12, respectively. One coil spring 2 is disposed in each of the first half housing 11 and the second half housing 12. Outer peripheral walls of the coil springs 2 are matched with inner peripheral walls of the mounting grooves 100. Necks 101 extending in a circumferential direction are formed on the inner peripheral walls of the mounting grooves 100; and correspondingly, clamping portions 21 capable of being clamped into the necks 101 are provided on the outer peripheral walls of the coil springs 2. The cover plates 5 are covered at openings of the mounting grooves 100 and fixed by screws 300, so that the coil springs 2 are prevented from escaping from the mounting grooves 100. Inner hooks 22 are disposed in middle portions of the coil springs 2. Correspondingly, through holes 51 are formed on the cover plates 5, and the ends of the winding shaft 3 pass through the corresponding through holes 51 to be connected to the inner hooks 22. Shaft portions 35 capable of being rotatably fitted with the through holes 51 on the corresponding cover plates 5 are disposed at both ends of the winding shaft 3, and clamping slots 351 extending in the axial direction and capable of clamping the inner hooks 22 of the coil springs 2 are formed on sidewalls of the shaft portions 35. With the above structure, the coil springs 2 can be limited in the housing 1 and the stability of stretching and retracting the towing belt 4 can be improved by using the through holes 51 on the cover plates 5 as the support structures for the rotation of the winding shaft 3.

Figure 5:
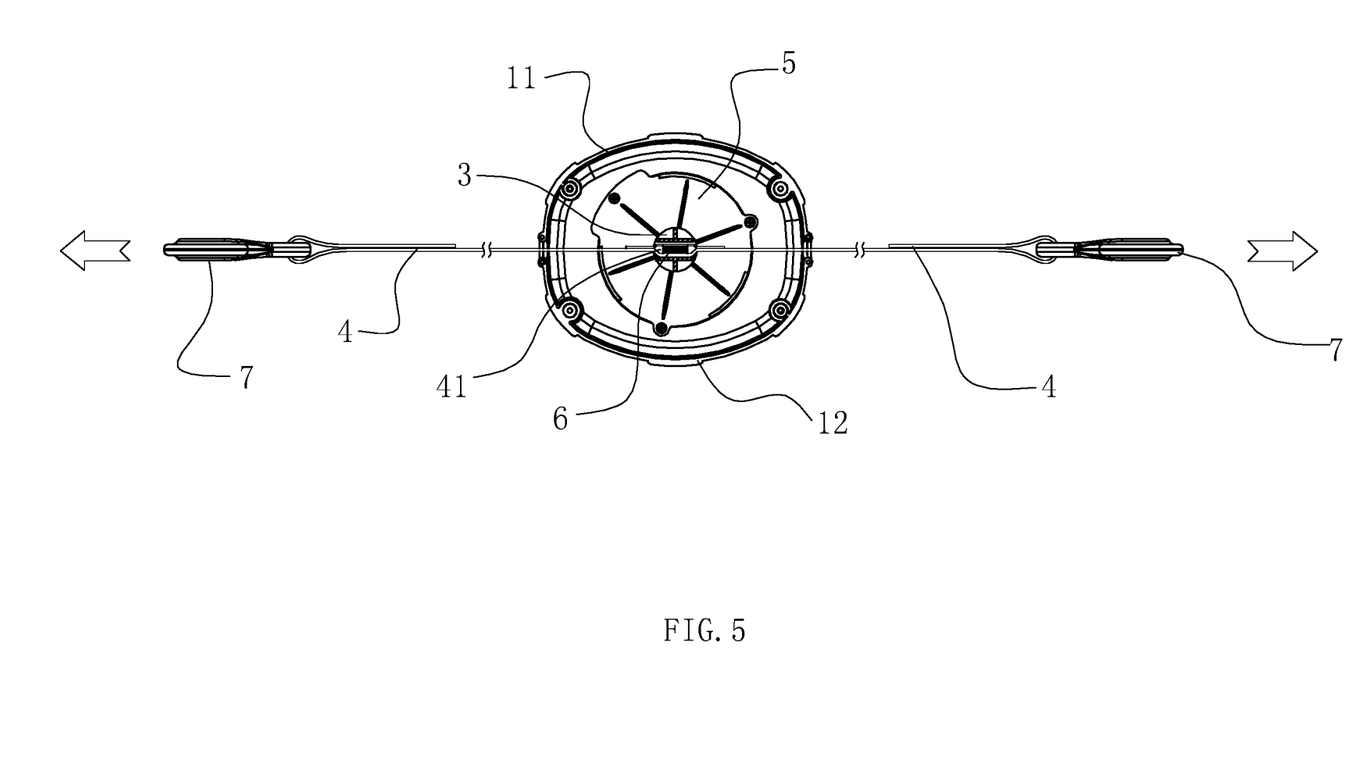
FIG. 5 is a perspective view of a stressed state of a towing belt when it is completely stretched according to the embodiment of the present invention.
Figure 6:
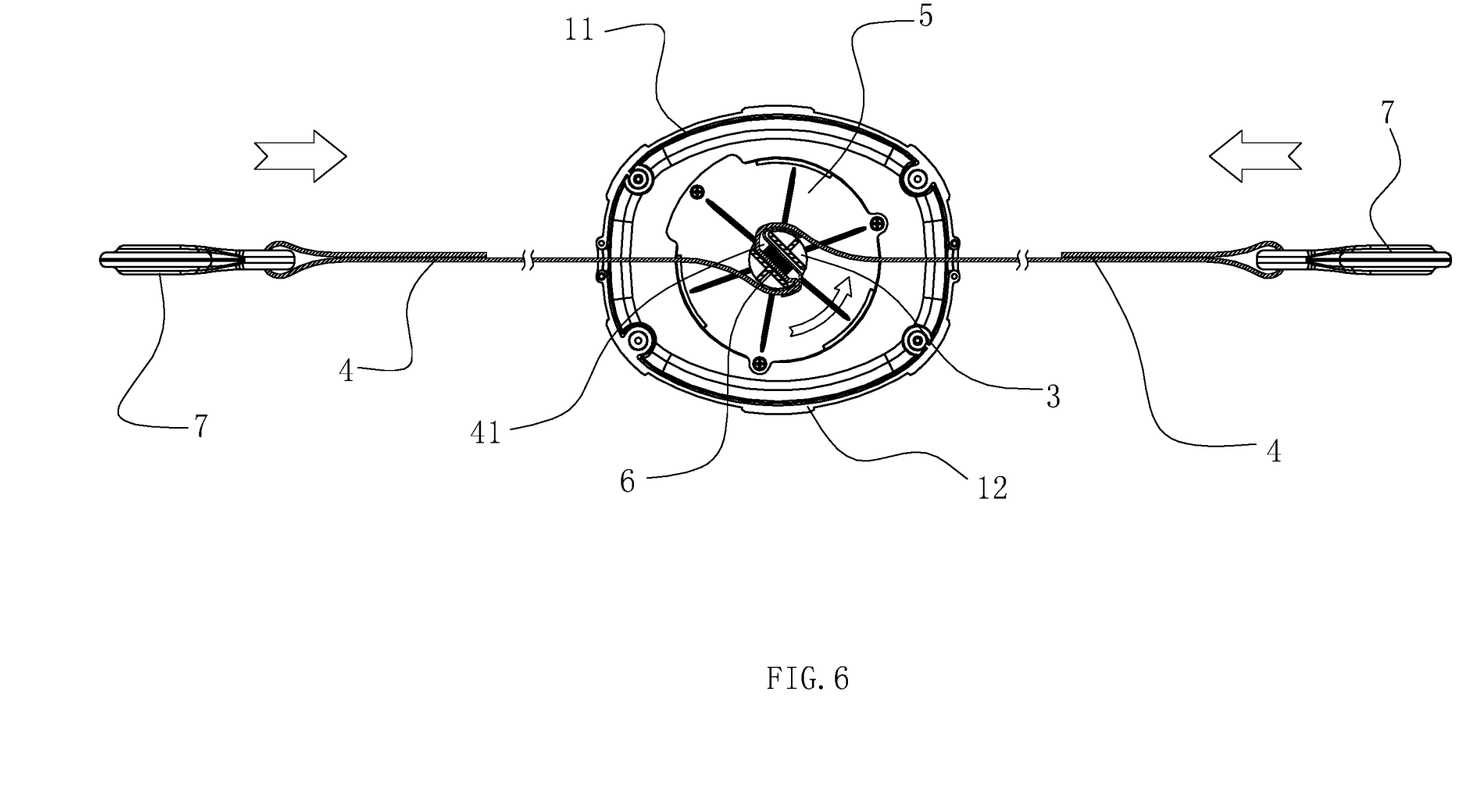
FIG. 6 is a perspective view of a state where the towing belt begins to retract according to the embodiment of the present invention.
Figure 7:
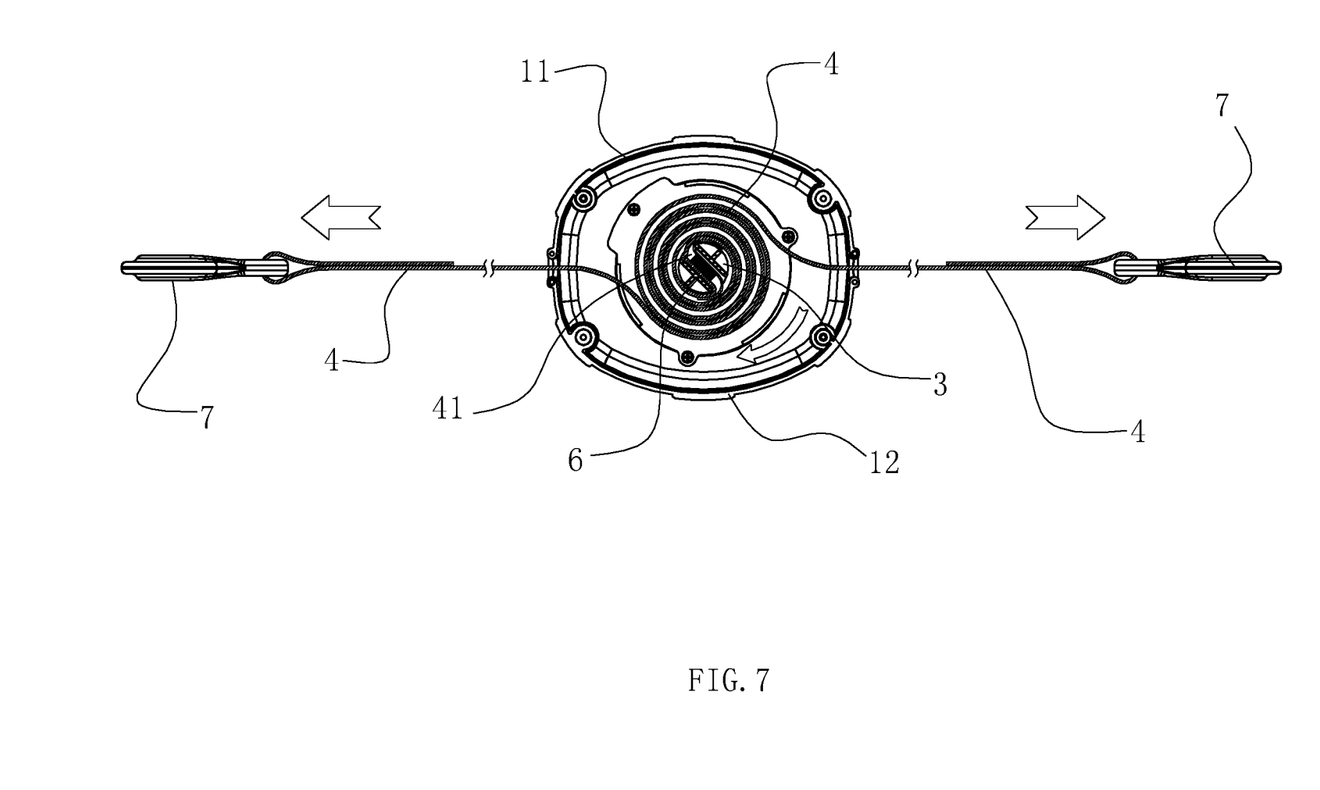
FIG. 7 is a perspective view of a state where the towing belt is stretched according to the embodiment of the present invention.
Figure 8:
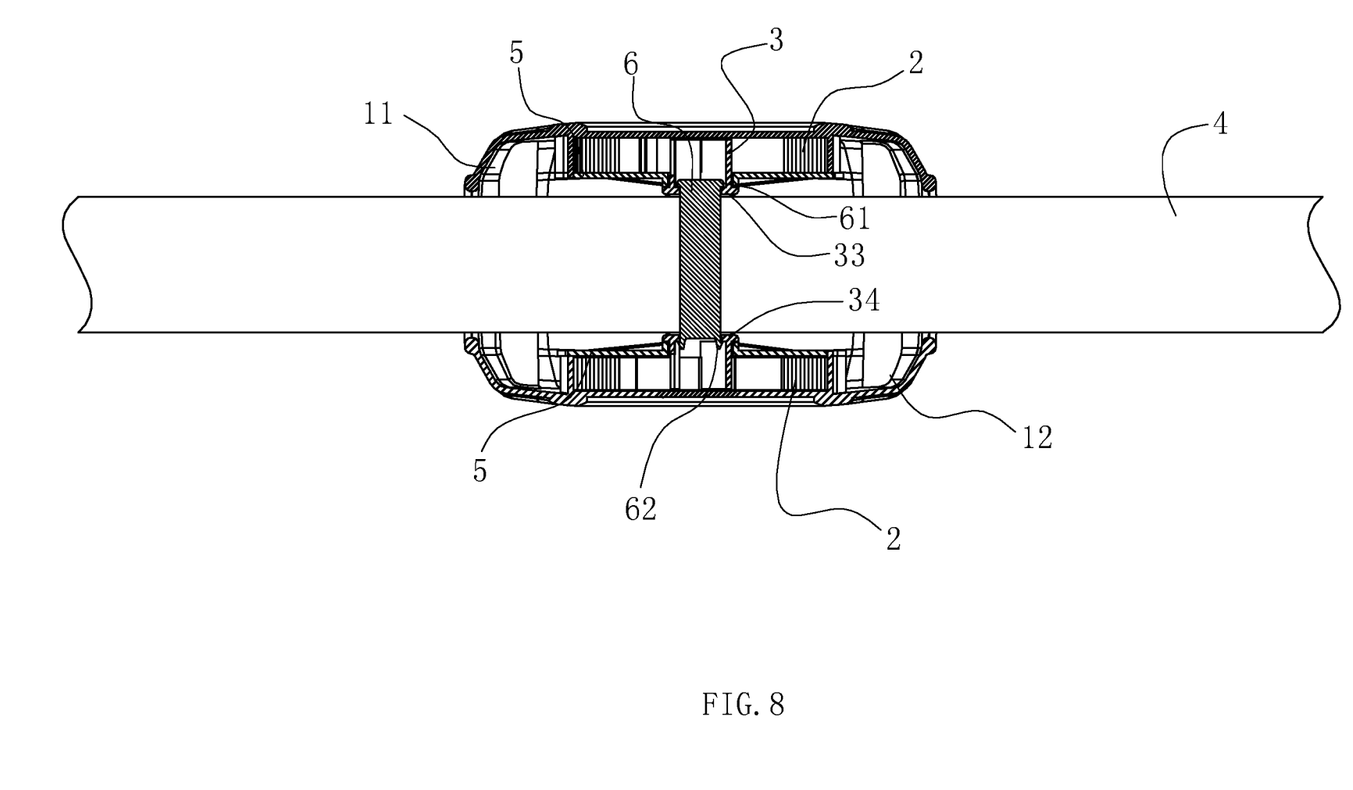
FIG. 8 is a sectional view of the embodiment of the present invention.

When in use of the automatically retractable automobile towing device in this embodiment, the hook 7 at one end of the towing belt 4 is caught on a tow vehicle, and the hook 7 at the other end of the towing belt 4 is caught on a vehicle to be towed. When the distance between two vehicles increases, the both ends of the towing belt 4 rotate the winding shaft 3 in an direction opposite to the winding direction of the towing belt 3, by overcoming the elasticity of the coil springs 2 under the tension of a pulling vehicle, and the both ends of the towing belt 4 are pulled out from the first openings 13 on the housing 1, respectively, until the towing belt 4 is completely stretched. In this case, the towing belt 4 and the hooks 7 are stressed, and the vehicle to be towed moves with the tow vehicle. During driving, if the tow vehicle is braked, the vehicle to be towed continues running due to inertia, and the distance between the two vehicles decreases. In this case, the towing belt 4 and the hooks 7 are automatically retracted due to the elasticity of the coil springs 2, so that the towing belt 4 can correspondingly change with the distance between the two vehicles, and the top strap 4 will not fall down to the ground due to the decreased distance between the vehicles. At the end of use, the hooks 7 are taken down, and the towing belt 4 is retracted into the housing 1, so that it is convenient for storage. When in use of the automatically retractable automobile towing device in this embodiment, no matter whether the towing belt 4 is stretched or retracted, the position of the winding shaft 3 remains unchanged, and the towing belt 4 on two ends of the winding shaft 3 can be equal in length, so that the stability of automobile towing is improved. Moreover, since the position of the winding shaft 3 relative to the towing belt 4 remains unchanged, the deviation of the towing belt 4 during the retraction process is avoided so that the towing belt 4 is allowed to stretch or retract smoothly, and the stability of automobile towing is further improved.

The invention claimed is:

1. An automatically retractable automobile towing device, comprising:
   a hollow housing having a wall and a mounting chamber inside and two first through holes disposed on the wall and in communication with the mounting chamber;
   two coil springs mounted inside the mounting chamber of the housing; a winding shaft having a first end and a second end, being rotatably assembled in the mounting chamber of the housing and connected to the coil springs;
   a towing belt having two ends and a middle portion, which passes through the winding shaft and is able to extend and retract with rotation of the winding shaft, each end of the towing belt extending out of the housing through the corresponding first through holes on the housing;
   a limiting mechanism for limiting the winding shaft at the middle portion of the towing belt;
   wherein
   the winding shaft has a second through hole arranged along a radial direction of the winding shaft for the towing belt to pass through;
   the towing belt has a third through hole arranged along an axial direction of the winding shaft formed in the middle portion of the towing belt;
   the middle portion of the towing belt is located inside the second through hole;
   a limiting block having a first end and a second end is disposed inside the third through hole of the towing belt, and the two ends of the limiting block is limited with the winding shaft;
   the limiting block, the second through hole and the third through hole forms the limiting mechanism.

2. The device of claim 1, wherein the winding shaft has a first limiting opening for receiving the end of the limiting block, so as to prevent the limiting block from making circumferential rotation.

3. The device of claim 1, wherein a positioning mechanism capable of preventing the axial movement of the limiting block in an axial direction of the winding shaft is further disposed on the winding shaft.

4. The device of claim 3, wherein
an annular first positioning step is protruding toward the limiting block from the inner wall of the winding shaft close to the first end of the limiting block, and an annular second positioning step is protruding toward the limiting block from the inner wall of the winding shaft close to the second end of the limiting block;
correspondingly, a positioning protrusion extending from the first end of the limiting block is positioned by the first positioning step, and an elastic pin, extending from the second end of the limiting block, which can pass through the first positioning step under a pressed state is positioned by the second positioning step;
the first positioning step, the second positioning step, the positioning protrusion and the elastic pin form the positioning mechanism.

5. The device of claim 1, wherein the housing comprises a first half housing and a second half housing which match each other;
mounting grooves for mounting corresponding coil springs are formed on inner walls of the first half housing and the second half housing, respectively, and outer peripheral walls of the coil springs are matched with inner peripheral walls of the mounting grooves.

6. The device of claim 5, wherein necks extending in a circumferential direction are formed on the inner peripheral walls of the mounting grooves;
clamping portions capable of being clamped into the necks are provided on the outer peripheral walls of the coil springs.

7. The device of claim 5, wherein cover plates capable of preventing the coil springs from escaping from the mounting grooves are disposed at openings of the mounting grooves; and
inner hooks are disposed in middle portions of the coil springs;
through holes are formed on the cover plates, and the ends of the wind shaft pass through the corresponding through holes to be connected with the inner hooks.

8. The device of claim 7, wherein shaft portions capable of being rotatably fitted with the through holes on the corresponding cover plate are disposed at both ends of the winding shaft, and clamping slots extending in an axial direction and capable of clamping the inner hooks of the coil springs are formed on sidewalls of the shaft portions.

9. The device of claim 1, wherein two hooks for connecting automobiles are disposed at both ends of the towing belt.

10. The device of claim 1, wherein a connecting belt is disposed on a side surface of the middle portion of the towing belt, and two ends of the connecting belt are connected to the towing belt, respectively, so that the third through hole is formed between the middle portion of the connecting belt and the corresponding towing belt.

* * * * *